United States Patent [19]

Himes

[11] Patent Number: 4,868,057
[45] Date of Patent: Sep. 19, 1989

[54] LAMINATED STRUCTURE COMPRISING A PLURALITY OF POLYMERIC LAYERS ADHERED WITH AN ADHESIVE COMPOSITION

[75] Inventor: Glenn R. Himes, Houston, Tex.

[73] Assignee: Shell Oil Company, Houston, Tex.

[21] Appl. No.: 135,909

[22] Filed: Dec. 21, 1987

[51] Int. Cl.$^4$ ............ B32B 27/36; B32B 27/08; B28B 3/20

[52] U.S. Cl. ............ 428/412; 428/516; 428/519; 428/520; 428/518; 428/424.8; 428/476.3; 428/483; 428/414; 264/176.1; 525/73; 525/74; 525/77; 525/78

[58] Field of Search ............ 428/412, 516, 519, 520

[56] References Cited

U.S. PATENT DOCUMENTS

| | | | |
|---|---|---|---|
| 3,231,635 | 1/1966 | Holden et al. | 260/880 |
| 3,265,765 | 8/1966 | Holden et al. | 260/876 |
| 3,322,856 | 5/1967 | Holden | 260/876 |
| 3,607,977 | 9/1971 | Taylor et al. | 260/876 |
| 3,700,633 | 10/1972 | Wald et al. | 260/880 B |
| 3,793,283 | 2/1974 | Frailey et al. | 260/33.6 AQ |
| 3,970,771 | 7/1976 | Davison | 428/425 |
| 4,058,647 | 11/1977 | Inoue et al. | 428/474 |
| 4,116,917 | 9/1978 | Eckert | 260/33.6 |
| 4,156,673 | 5/1979 | Eckert | 260/33.6 |
| 4,198,327 | 4/1980 | Matsumoto et al. | 260/4 |
| 4,332,858 | 6/1982 | Saitoh et al. | 428/412 |
| 4,341,837 | 7/1982 | Katsuto et al. | 428/336 |
| 4,588,648 | 5/1986 | Krueger et al. | 428/475.8 |

*Primary Examiner*—P. C. Ives

[57] ABSTRACT

A laminated structure comprising a plurality of polymeric layers at least two of said polymeric layers bonded together with an adhesive composition comprising a modified olefin polymer and at least one selectively hydrogenated block copolymer having at least one block which is predominantly a monoalkenyl aromatic hydrocarbon polymer block and at least one block which is a hydrogenated conjugated diolefin polymeric block. The adhesive composition used in the laminated structure significantly improves compatibility of the various polymeric layers thereby enabling the laminated structure or any excess thereof to be used in recycle as well as various molding applications.

16 Claims, No Drawings

LAMINATED STRUCTURE COMPRISING A PLURALITY OF POLYMERIC LAYERS ADHERED WITH AN ADHESIVE COMPOSITION

BACKGROUND

1. Field of the Invention

This invention relates to a laminated structure. More particularly, this invention relates to a laminated structure comprising a plurality of polymeric layers.

2. Prior Art

Laminated structures comprising a plurality of polymeric layers are, of course, well known in the prior art. Such structures are taught in U.S. Pat. Nos. 4,058,647; 4,198,327; 4,332,858; 4,341,837 and 4,588,648 and in Japanese Patent Application No. Sho58 [1983]-13242. In general, laminated structures comprising a plurality of polymeric layers are fabricated for the purpose of obtaining a single structure having the advantages of each of the separate layers. Before such structures will perform successfully, however, it is important that the various layers be suitably adhered one to the other so as to avoid separation during use. Heretofore, several methods have been proposed for effecting such suitable adherence of layers. For example, U.S. Pat. No. 4,058,647 teaches that certain polymeric materials, including ethylene-vinyl alcohol copolymers, may be laminated with a polymeric composition comprising both a modified and an unmodified polyolefin and a rubber component. Similarly, U.S. Pat. No. 4,198,327 teaches that various polymeric materials, including polycarbonates and ethylene-vinyl alcohol copolymers, may be satisfactorily bonded together with a composition comprising a carboxylated polyolefin and a hydrocarbon elastomer. U.S. Pat. Nos. 4,332,858 and 4,341,837 teach that various polymeric materials including olefin homopolymers, olefin copolymers such as ethylene and vinyl alcohol, polycarbonates and the like may be adhered with a modified, but unhydrogenated, block copolymer such as a maleated block copolymer of styrene and butadiene. The modified block copolymers taught by these patents, however, are subject to degradation at temperatures above about 205° C. and cannot effectively be used when the preparation or subsequent treatment or use of the laminates requires temperatures above this value. As a result, the modified, but unhydrogenated, styrene-butadiene block copolymers cannot effectively be used in the preparation of laminates via coextrusion with a relatively broad range of polymeric materials since temperatures above 205° C. are frequently required. Moreover, the resulting laminates cannot be finished or used at temperatures as high as those frequently desired for certain laminate applications such as thermoforming, retorting, hot filling and the like. U.S. Pat. No. 4,588,648 teaches that certain polymeric materials such as polypropylene and ethylene/vinyl alcohol copolymers may be laminated with an adhesive layer comprising a grafted copolymer of an olefin and maleic anhydride and an ungrafted polypropylene. As is well known, tie layers of this type are particularly effective in the preparation of various laminates but layers of certain such laminates are not sufficiently compatible to permit the recycle of any excess of such laminate; i.e., laminate remaining after a pattern has been cut or otherwise separated from the laminated structure. This, then, significantly restricts the range of polymeric materials that can be laminated, particularly when high costs are associated with the excess waste. Japanese Patent Application No. Sho58 [1983]-13242 teaches that various polymeric materials such as olefin homopolymers, olefin copolymers such as ethylene/vinyl alcohol, polycarbonates and the like may be tied in a laminated structure with an adhesive comprising a modified crystalline olefin-based polymer, which adhesives may also comprise an unhydrogenated block copolymer of styrene and butadiene. This particular adhesive, then, would to some extent, at least, exhibit the compatibility problems known to be associated with modified olefin polymers and also be subject to the temperature restrictions known to be associated with adhesives comprising styrene-butadiene block copolymers containing significant ethylenic unsaturation in the butadiene polymer block. In light of these deficiencies, then, the need for a laminated structure which is compatible (i.e., can be recycled) and which can be used without severe temperature limitations is believed to be readily apparent.

Adhesive and similar compositions which may, at least, comprise a hydrogenated block copolymer containing at least one monoalkenyl aromatic hydrocarbon block and at least one conjugated diolefin block, which adhesive compositions would be useful over a broader range of temperatures, are, of course, known in the prior art. Polymeric compositions which may contain a hydrogenated block copolymer are taught, for example, in U.S. Patent Nos. 3,607,977 and 3,970,711 and in European Patent Application No. 0169987. U.S. Patent No. 3,607,977 teaches compositions comprising a block copolymer containing at least two monoalkenyl aromatic hydrocarbon polymer blocks and at least one conjugated diolefin polymer block and a block copolymer comprising at least one monoalkenyl aromatic hydrocarbon polymer block and at least one conjugated diolefin block wherein at least 10% of the initial unsaturation is reacted so as to incorporate a polar group. The block copolymers may, independently, be neat or hydrogenated. The polar group may, inter alia, be an oxygen containing group such as a carboxyl group. Compositions comprising an oxygen containing group are said to be especially useful as adhesives, particularly for polar textile such as cellulose. U.S. Patent 3,970,771 teaches a primer coating composition comprising a selectively hydrogenated block copolymer having at least two monoalkenyl aromatic hydrocarbon polymer blocks and at least one hydrogenated polymer block of a conjugated diolefin, a substantial portion of a resin compatible with the monoalkenyl aromatic hydrocarbon polymer blocks and, optionally, a substantial portion of certain carboxylated resins. The primer is useful for bonding various coating materials to substrates having low energy surfaces such as substrates which are essentially hydrocarbon. European Patent Application 0169987 teaches an adhesive composition comprising a copolymer of an olefin and an ethylenically unsaturated carboxylic acid, and, optionally, an elastomer which may be a hydrogenated block copolymer of a diene and a vinyl aromatic compound. The adhesive composition may be used to bond a polymer layer such as a polyamide or polyester to a metallic screen. While certain of the adhesive compositions taught by these patents would be useful over a broader range of temperatures than those heretofore used in the preparation of polymeric laminates, particularly polymeric laminates comprising polar and non-polar polymeric layers, there is no indication that these adhesives would be useful for the preparation of such structures. The need, then, for laminated structures, particularly a laminated structure comprising a polycarbonate, which is both compatible and useful at higher temperatures continues.

SUMMARY OF THE INVENTION

It has now been discovered that the foregoing and other disadvantages of the prior art laminated structures can be overcome or at least significantly reduced with laminated structures prepared with the adhesive composition of this invention and an improved laminated structure comprising a plurality of polymeric layers provided therewith. It is, therefore, an object of the present invention to provide an improved adhesive composition for use in the preparation of polymeric laminates, particularly those containing a polycarbonate. It is another object of this invention to provide such an improved adhesive composition which can be used to produce polymeric laminates having improved compatibility. It is still another object of this invention to provide such an improved adhesive composition which can be used at relatively high temperatures without degradation thereof. It is yet another object of this invention to provide polymeric laminates prepared with the improved adhesive composition of this invention, which polymeric laminates are both compatible and useful at relatively high temperatures. The foregoing and other objects and advantages will become apparent from the description set forth hereinafter.

In accordance with the present invention, the foregoing and other objects and advantages are accomplished by using an adhesive composition comprising (1) at least one block copolymer containing at least one block which is predominantly a monoalkenyl aromatic hydrocarbon polymer block and at least one block which is predominantly a hydrogenated conjugated diolefin polymer block and (2) a modified olefin polymer as the adhesive layer to bond at least two of the layers in a laminated structure comprising a plurality of polymeric layers. Each of the polymeric layers may be the same or a different polymeric material. The modified olefin polymer useful in the adhesive composition of this invention may be modified using conventional techniques so as to incorporate a polar group which will enhance the adhesive characteristics of the adhesive composition at least with respect to polar polymeric material.

DETAILED DESCRIPTION OF THE INVENTION

As indicated supra, the present invention relates to a laminated structure comprising a plurality of polymeric layers at least certain of which layers are bonded together with an adhesive composition comprising (1) a modified olefin polymer and (2) at least one selectively hydrogenated block copolymer containing at least one block which is predominantly a monoalkenyl aromatic hydrocarbon polymer block and at least one block which is predominantly a hydrogenated conjugated diolefin polymer block. The modified olefin polymer will be modified using conventional techniques to incorporate a polar group which will enhance the adhesive characteristics of the adhesive composition at least as to polar polymers.

Olefin polymers which may be modified and used in the adhesive composition of this invention include homopolymers and copolymers of lower alpha olefins, particularly alpha olefins having from 2 to about 8 carbon atoms, such as ethylene, propylene, butene, pentene, hexene and the like. α-olefins containing 2 to 8 carbon atoms are preferred and α-olefins containing 2 and 3 carbon atoms are particularly preferred. In general, the olefin copolymers which may be modified and used in adhesive composition of this invention may be block, tapered or random. The olefin polymers which may be modified and used in the adhesive composition will, generally, have a degree of crystallinity, as determined by X-ray analysis, within the range from about 40 to about 60% and melt within the range from about 130° to about 170° C., have a melt flow or melt index within the range from about 1 to about 20 g/10 mins, as determined in accordance with ASTM D-1238-86 and densities within the range from about 0.89 to about 0.91 g/cc, as determined in accordance with ASTM D-1505-85.

In general, any polar group known in the prior art to enhance adhesive properties may be incorporated into the modified hydrocarbon polymer useful in the adhesive compositions of this invention. Suitable polar groups, then, include halogen, hydroxyl, carboxyl, carbonyl, phosphono, acid anhydride, amino, epoxy, mercapto, sulfate, sulfonate, amido, ester and the like. Of these, the carboxyl and acid anhydride groups are particularly preferred. In general, the polar groups may be incorporated into the olefin polymer by copolymerizing a suitable monomer containing the desired polar group with the olefin monomer or monomers during preparation of the olefin polymer thereby producing a copolymer containing the desired polar group. Alternatively, the polar group may be grafted onto a preformed olefin polymer using means well known in the prior art.

Unsaturated acids and anhydrides which may be used to modify the olefin polymer useful in the adhesive composition of this invention include the polyfunctional acids and anhydrides, particularly the dicarboxylic acids and anhydrides, and the monofunctional acids and anhydrides. Suitable dicarboxylic acids and anhydrides include maleic, fumaric, itaconic, citraconic, chloromaleic, mesaconic, glutoconic and the like. Suitable monofunctional acids and anhydrides include acrylic and methacrylic and the like. As indicated supra, these unsaturated acids and anhydrides may be incorporated into the base polymer as a comonomer or the same may be grafted onto a preformed polymer. In any case, the content of the functional group and particularly the carboxylic acid or anhydride in the modified olefin polymer will range from about 0.01 to about 5 wt %, preferably from about 0.1 to about 2.5 wt %.

In general, the modified olefin polymers useful in the adhesive composition of this invention may be prepared via any of the techniques known in the prior art including preparation in bulk, suspension, solution or emulsion. Polymerization of the monomers to produce the unmodified olefin polymer may be accomplished using free-radical, cationic and anionic initiators or polymerization catalysts. When a polar monomer is incorporated initially, however, free-radical polymerization techniques will most generally be used. Similarly, grafting may be accomplished by combining a preformed polymer with a selected polar compound such as an unsaturated acid or anhydride or mixtures thereof and a free radical initiator and thereafter heating the mixture to a suitable temperature.

In general, the block compolymer useful in the adhesive composition of this invention will be a selectively hydrogenated block copolymer which may be linear or radial having one of the following general formulae: $B_x$—$(A\text{-}B)_y$—$A_z$; $A_x$—$(B\text{-}A)_y$—$B_z$; $[B_x(A\text{-}B)_y$—$A_z]$-

$_n$—C or $[A_x—(B-A)_y—B_z]_n$—C where in x and z are, independently, a number equal to 0 or 1; y is a whole number from 1 to 15, n is a number from 3 to 15 as determined by GPC and C is a polyfunctional coupling agent nucleus. Linear block copolymers of the type illustrated in first two formulae, prior to hydrogenation, may be prepared in accordance with methods well known, such as those described, for example, in U.S. Pat. Nos. 3,231,635; 3,265,765; and 3,322,856, and the disclosure of which patents are herein incorporated by reference. Radial block copolymers of the type illustrated in the last two formulae, before hydrogenation, may also be prepared in accordance with methods well know, as those described, for example, in U.S. Pat. Nos. 4,116,917, and 4,156,673, the disclosure of which patents are also herein incorporated by reference.

The block copolymers useful in this invention may be selectively hydrogenated via techniques well known in the prior art such as by the method taught in U.S. Pat. No. 3,700,633, the disclosure of which patent is herein incorporated by reference. In general, the selective hydrogenation will be accomplished so as to selectively hydrogenate at least about 90 wt % of the ethylenic unsaturation initially contained in the copolymer, preferably such that at least about 98 wt % of the initial ethylenic unsaturation is hydrogenated. Surprisingly, substantial hydrogenation of the block copolymer increases the polymer's resistance to heat and thereby permits higher temperature application of the adhesive composition of this invention. Moreover, due to this heat resistance, the adhesive composition of this invention may be coextruded with a broader range of polymeric materials than has heretofore been possible with adhesive compositions comprising block copolymers. Also surprisingly, hydrogenation improves the compatibility of the polymers bonded therewith thereby permitting use of the waste from the laminate in recycle and other applications.

In the formulae set forth above, A is predominantly a monoalkenyl aromatic hydrocarbon polymeric block and B is predominantly a conjugated diolefin polymeric block which will be hydrogenated. By predominantly, it is meant that the respective block will comprise at least about 90 wt % of the specified monomeric unit in the polymeric block. In the predominantly monoalkenyl aromatic block, other monomers such as a conjugated diolefin may be present. When other monomers are present in the monoalkenyl aromatic hydrocarbon polymer block, the predominantly monoalkenyl aromatic block may be random, tapered or block itself. Similarly, in the predominantly conjugated diolefin polymeric block, other monomers such as monoalkenyl aromatic monomers may be present. When other monomers are present, this block too may itself be random, tapered or block.

In general, any of the monoalkenyl aromatic hydrocarbon monomers known to be useful in block copolymers of this type, such as those disclosed in the above-identified U.S. patents may be used in the block copolymer useful in this invention. Suitable monoalkenyl aromatic monomers, then, include styrene, alkyl-substituted styrenes, alkoxysubstituted styrenes, vinylnaphthalene, alkyl-substituted vinyl naphthalenes and the like. Similarly, any of the conjugated diolefins known to be useful in block copolymers of this type may be used in the block copolymer of the present invention. Suitable conjugated diolefins, then, include those containing from 4 to about 12 carbon atoms such as 1,3-butadiene, isoprene, piperylene, methylpentadiene, phenylbutadiene, 3,4-dimethyl-1,3-hexadiene, 4,5-diethyl-2,3-octadiene and the like. Preferably, the conjugated diolefin will contain 4 to about 8 carbon atoms and most preferably, the conjugated diolefin will be either butadiene or isoprene. In general, the block copolymer useful in the adhesive composition of the present invention will contain from about 10 to about 35 wt % monoalkenyl aromatic hydrocarbon monomer and from about 90 to about 65 wt % conjugated diolefin monomer. In general, the block copolymers will have a number average molecular weight within the range from about 12,000 to about 300,000, the monoalkenyl aromatic hydrocarbon blocks will have a number average molecular weight within the range from about 1,000 to about 50,000 and the conjugated diolefin blocks will have a number average molecular weight within the range from about 10,000 to about 300,000.

In general, the adhesive compositions of this invention will contain from about 5 to about 50 wt % of the modified polyolefin and from about 50 to about 95 wt % of block copolymer. To insure adequate adhesion, however, modified polyolefins containing functional groups in the upper portion of the content range heretofore specified (0.01 to 5.0 wt %) will be incorporated into the adhesive compositions in amounts in the lower portion of the 5 to 50 wt % range while modified polyolefins containing functional groups in the lower portion of the content range will be incorporated into the adhesive compositions in amounts in the upper portion of the 5 to 50 wt % range. The optimum amount of modified polyolefin will, of course, vary with the particular polymeric material or materials do be bonded therewith.

In general, the modified olefin polymer and the block copolymer may be blended to form the adhesive composition of the present invention using any of the techniques known in the prior art to be suitable for the blending of such polymeric compositions. Suitable blending techniques, then, include physical admixture of solid particles of each of the polymeric components, solution admixture and admixture in the molten phase. Of these, admixture in the molten phase is preferred, particularly when coupled with relatively high shear agitation, since this technique will, generally, produce the most uniform admixture.

In general, the adhesive composition of this invention may be used to bond any one of certain polymeric materials either to itself or to certain other polymeric materials. The polymeric material may, then, be polar or nonpolar. Suitable polymeric materials that may be bonded with the adhesive composition of this invention include olefin polymers, copolymers of olefins with one or more other monomers, polyacrylates, polycarbonates, alkenyl aromatic hydrocarbon polymers and the like.

Olefin polymers which may comprise one or more layers of the multilayer laminate of this invention include homopolymers and copolymers of monoolefin and polyolefins having from 2 to about 12 carbon atoms such as ethylene, propylene, 1-butene, 2-butene, isobutene, pentene, hexene, 1,3-butadiene, isoprene, piperylene, and the like. Suitable olefin homopolymers, then, include low, medium and high density polyethylene, polypropylene, polybutene, polybutadiene, polyisoprene and the like. Examples of olefin copolymers include ethylene-propylene copolymer, ethylene-butene copolymer, ethylene-propylene-hexadiene copolymer, ethylene-propylene-norbonene copolymer and the like.

Copolymers of an olefin and one or more other monomers which may be used as one or more of the layers in the laminate of this invention include copolymers containing one or more mono or polyolefins containing from about 2 to about 12 carbon atoms and one or more other monomers such as unsaturated esters, unsaturated acids, unsaturated alcohols, unsaturated ionomers and the like. Suitable olefin copolymers, then, include ethylene vinyl acetate copolymer, ethylene-vinyl alcohol copolymer, ethylene-acrylic acid copolymer and the like.

Polyesters that may be used as one or more layers of the laminated structure of this invention include condensation products of polycarboxylic acids and polyhydric alcohols and/or polyepoxides, and addition products of unsaturated esters such as acrylic esters and methacrylic esters. Suitable polyesters, then, include polymethacrylate, polybutylmethacrylate, methylmethacrylate-methylacrylate copolymers, and the like.

Polycarbonates useful as one or more layers in the laminated structure of this invention include those polymers derived from the direct reaction between aromatic and/or aliphatic dihydroxy compounds with phosgenes or by the ester exchange reaction with appropriate phosgene derived precursors. The structural units within the polymer are linked by the carbonate group. Suitable polycarbonates, then, include the reaction product of bisphenol-A with phosgene.

Alkenyl aromatic hydrocarbon polymers which may constitute one or more layers of the laminated structure of this invention include homopolymers and copolymers of alkenyl aromatic hydrocarbon monomers such as styrene, alkyl-substituted styrenes, alkoxy-substituted styrenes, vinyl naphthalene, alkyl-substituted vinyl naphthalenes and the like.

Suitable alkenyl aromatic hydrocarbon polymers, then, include polystyrene, poly(α-methyl)styrene, poly(methoxy)styrene and the like.

In general, any of the processes known in the prior art to be useful for the preparation of a laminated structure may be used to produce the laminated structure of this invention. Suitable fabricating methods, then, include coextrusion processes wherein the separate layers are separately extruded and then laminated together as they pass through a multilayer die; processes wherein the adhesive layer is previously formed into a film or sheet, the placed between two preformed polymeric layers and heated and pressed by means of a hot pressure or the like to bond the adhesive film to the polymeric layers; hot lamination processes wherein the adhesive composition of this invention is melted and then coated onto one or more polymeric structures, which polymeric structures are then pressed together and cooled; solvent lamination processes wherein the adhesive composition of this invention is dissolved in a solvent, coated on one or more polymeric structures to be laminated, the solvent evaporated and the laminate then heated and pressed to effect the desired bonding; and wet lamination processes wherein the adhesive composition of this invention is used as a latex to bond the several layers of a laminated structure. Of these several processes, coextrusion is preferred since the adhesive composition of this invention exhibits a relatively broad operating temperature range thereby permitting the necessary flow adjustments through variations in temperature needed to permit the formation of a uniform laminated structure.

The laminated structures of this invention may be used in any of the applications known in the prior art for such laminates. Suitable uses, then, include packaging films in the form of films and sheets and as materials for molding such as blow molding, vacuum forming and air pressure forming.

PREFERRED EMBODIMENT OF THE INVENTION

In a preferred embodiment of the present invention, the adhesive composition will comprise from about 60 to about 90 wt % of at least one block copolymer comprising at lest one block of styrene and at least one block of butadiene or isoprene and from about 40 to about 10 wt % of a maleated polypropylene having a melt index within the range from about 3.0 to about 10.0 g/10 min., a degree of crystallinity within the range from about 40 to about 60%, a density within the range from about 0.89 to about 0.91 g/cc, a melting point within the range from about 130 to about 150° C. and containing from about 0.1 to about 2.5 wt % maleic acid units. In the preferred embodiment, the block copolymer will be selectively hydrogenated such that at least about 98% of the ethylenic unsaturation initially contained therein is converted (saturated). In the preferred embodiment, the block copolymer contained in the adhesive composition will contain from about 10 to about 35 wt % styrene and from about 90 to about 65 wt % either butadiene or isoprene. Also in a preferred embodiment of the present invention, the adhesive composition will be used to form a laminate comprising one layer of polypropylene, one layer of an ethylene-vinyl alcohol copolymer and one layer of a polycarbonate. In the preferred embodiment, the laminate will be coextruded such that the adhesive composition of this invention forms a tie layer between the polypropylene layer and the ethylene-vinyl alcohol copolymer layer and a tie layer between the ethylene-vinyl alcohol copolymer layer and the polycarbonate layer. In the preferred embodiment, the polypropylene layer will be from about 0.02 to about 3 mm thick, the ethylene-vinyl alcohol copolymer layer will be from about 0.002 to about 0.2 mm thick and the polycarbonate layer will be from about 0.01 to about 3 mm thick. Each of the adhesive tie layers will be from about 0.005 o about 0.5 mm thick. The preferred laminated structure will be used as a packaging film.

In a most preferred embodiment of the present invention, a blend of block copolymers will be used, said blend having better rheological properties for coextruding than at least most block copolymers when used singly. In this most preferred embodiment, the block copolymer blend will comprise from about 60 to about 97 wt % of at least one triblock copolymer having polystyrene end blocks and a central hydrogenated polybutadiene or hydrogenated polyisoprene block and from about 40 to about 3 wt % of at least one diblock copolymer having a single polystyrene block and a single hydrogenated polybutadiene or hydrogenated polyisoprene block. The weight average molecular weight of the polystyrene blocks in the triblock copolymer will be within the range from about 4,000 to about 15,000 while the weight average molecular weight of the polystyrene block in the diblock copolymer will be within the range from about 4,000 to about 9,000. The weight average molecular weight of the hydrogenated conjugated diolefin blocks in both polymers will be within the range from about 15,000 to about 80,000.

Having thus broadly described the present invention and a preferred and most preferred embodiment thereof, it is believed that the invention will become even more apparent by reference to the following examples. It will be appreciated, however, that the examples are presented solely for purposes of illustration and should not be construed as limiting the invention.

EXAMPLE 1

In this example, two adhesive compositions within the scope of the present invention were prepared and then used as a tie layer to bond a polycarbonate and an ethylene vinyl alcohol copolymer in a coextrusion operation. The polycarbonate used is a copolymer formed by reacting bisphenol-A and phosgene having a number average molecular weight of about 12,000 which polycarbonate is available commercially from General Electric Company under the tradename "Lexan". The ethylene vinyl alcohol copolymer was prepared by saponifying an ethylene-vinyl acetate copolymer having a number average molecular weight of about 15,000 and a vinyl acetate content of about 65%. The ethylene-vinyl alcohol copolymer used is available commercially from Eval Company of America under the tradename "EVAL". In the coextruded laminated structure, the thickness of the polycarbonate layer was 0.2 mm, the thickness of the ethylenevinyl alcohol copolymer layer was 0.1 mm and the thickness of the tie layer was 0.02 mm. After the laminated structures were prepared, the peel strength in both the machine and transverse direction was determined using a modified standard test procedure; viz., ASTM D-1876. The test procedure was modified by reducing the head speed from 10 in./min. to 2 in./min. The first of the tie layers used in preparation of the laminated structures in this example contained 53 wt % of a selectively hydrogenated styrene-butadiene-styrene block copolymer, 22 wt % of a selectively hydrogenated styrene-butadiene diblock copolymer and 25 wt % of a maleated polypropylene. Both of the block copolymers contained 13 wt % styrene and 87 wt % hydrogenated butadiene. Each of the styrene blocks in both block copolymers had a number average molecular weight of about 5,000 and the hydrogenated butadiene block of the triblock copolymer had a number average molecular weight of about 70,000 while the hydrogenated butadiene block of the diblock copolymer had a number average molecular weight of about 35,000. The polypropylene was modified by grafting maleic anhydride onto a crystalline polypropylene prepared with a coordination catalyst. The modified polypropylene contained 1.0 wt % maleic anhydride units. The second of the tie layers prepared and used in this example contained about 61.8 wt % of a styrene-butadiene-styrene triblock copolymer identical to that used in the first tie-layer, about 25.7 wt % of a diblock copolymer identical to that used in the first tie-layer and 12.5 wt % of a maleated polypropylene identical to that used in the first tie-layer. Both adhesive (tie-layer) compositions were prepared by blending the two polymeric components in the molten phase with relatively high shear agitation for a time of about 5 minutes. Both of the adhesive (tie-layer) compositions tested in this example significantly improved the adhesion between the two layers when compared to the adhesion between the layers that can be obtained without an adhesive composition. Of the two adhesives, the adhesive containing 25 wt % of maleated polypropylene exhibited a peel strength of about 2.7 pli in the machine direction and about 2.5 pli in both the transverse direction while the adhesive composition comprising only 12.5% maleated polypropylene gave a peel strength of about 1.2 pli in both the machine direction and the transverse direction.

EXAMPLE 2

In this example, the tests of Example 1 were repeated except that two tie layers comprising: 58 wt % of a selectively hydrogenated styrene-butadiene-styrene block copolymer containing 29 wt % styrene and 71 wt % hydrogenated butadiene, each of the styrene blocks having a number average molecular weight of about 7,000 and the butadiene block having a number average molecular weight of about 35,000; 17 wt % of a selectively hydrogenated styrene-butadiene diblock copolymer also containing 29 wt % styrene and 71 wt % butadiene, the styrene blocks having a number average molecular weight of about 7,000 and the hydrogenated butadiene block having a number average weight of about 17,000; and 25 wt % of the same modified polypropylene as was used in the adhesive compositions of Example 1 were substituted for the two adhesive compositions used in Example 1. Both adhesive (tie-layer) compositions were prepared by blending the three polymeric components in the molten phase at relatively high shear agitation using two different blending methods. The first of the compositions was blended in a Banbury mixer and the second in a Haake twin-screw extruder blender, which methods are well known in the prior art. The peel strength of both blends was very close to the same in both the machine and transverse direction. Peel strengths in the transverse direction (2.3 pli and 2.4 pli, respectively) were, however, higher than the peel strengths in the machine direction. Both blends exhibited a peel strength in the machine direction of 0.5 pli.

EXAMPLE 3

In this example, two adhesive compositions within the scope of the present invention were prepared and then tested for adhesive strength to both a polycarbonate and to an ethylene-vinyl alcohol copolymer. Both the polycarbonate and the ethylene-vinyl alcohol copolymer used in this example were identical to the polycarbonate and ethylene-vinyl alcohol copolymer used in Example 1. One of the two adhesive compositions within the scope of this invention tested in this example contained 75 wt % of a selectively hydrogenated styrene-butadiene-styrene block copolymer containing 29 wt % styrene and 71 wt % hydrogenated butadiene, each styrene block having a number average molecular weight of 7,000 and the butadiene block having number average molecular weight of 35,000 and 25% of the same modified polypropylene used in Example 1. The second adhesive composition within the scope of this invention contained 50 wt % of the same selectively hydrogenated styrene-butadiene-styrene block copolymer and 50 wt % of the same modified polypropylene. The results obtained with the two adhesive compositions within the scope of this invention tested in this Example were compared to the results obtained when the same selectively hydrogenated styrene-butadiene-styrene block copolymer was used without a maleated polypropylene as the adhesive layer. In testing the adhesive strength of the three compositions, (two within the scope of this invention and one without the scope of this invention) the adhesive composition was first placed between a layer of the polycarbonate and a layer of the ethylene-vinyl alcohol copolymer and the laminated structure then pressed at a pressure of about 200 psig and at a temperature of 460° C. for 2 minutes. The peel strength with respect to each layer was then determined using the same modified standard peel strength test as was used in Example 1. As a result of these tests, it was determined that the peel strength of the polycarbonate when only the block copolymer was used as the adhesive layer was about 2.5 pli. The peel strength increased to about 9 when the adhesive composition comprising 25% of the maleated polypropylene was used and then dropped to about 2 when the adhesive composition comprising about 50 wt % maleated polypropylene was used. The peel strength with respect to the ethylene-vinyl alcohol copolymer layer, on the hand, was about 0.2 when the block copolymer alone was used as the adhesive layer. The peel strength increased to about 5 pli when the adhesive composition comprising 25% maleated polypropylene was used and further increased to about 8 when the adhesive composition comprising 50 wt % polypropylene was used. These data suggest that optimum adhesion with respect to the polycarbonate is achieved with a composition containing about 25 wt % maleated polypropylene while optimum adhesion with respect to ethylene-vinyl alcohol is obtained with a composition comprising about 50 wt % maleated polyproylene. The optimum composition, then, for use with both substrates would be a composition comprising somewhere between 25 and 50 wt % modified polypropylene.

EXAMPLE 4

In this example, a series of four adhesive compositions within the scope of the present invention were prepared and then used to bond a polycarbonate to an ethylene-vinyl alcohol. The bonding was accomplished by placing the adhesive composition between a layer of polycarbonate and a layer of ethylene-vinyl alcohol copolymer and then pressing at a pressure of 200 psig at 530° F. The peel strength was again determined using the modified procedure used in Example 1. For comparision purposes, the peel strength of each polymeric material was also determined when the block copolymer used in the adhesive composition within the scope of this invention was used without a maleated hydrocarbon polymer. In each of the compositions tested in this example, a blend of a selectively hydrogenated styrene-butadiene-styrene triblock copolymer containing 13 wt % styrene and 87 wt % butadiene, each styrene block having a number average molecular weight of about 5,000 and the polybutadiene block having a number average molecular weight of the 70,000 and a selectively hydrogenated styrene-butadiene diblock copolymer also containing 13 wt % styrene and 87 wt % hydrogenated butadiene, the styrene block having a number average molecular weight of about 5,000 and the butadiene block having a number average molecular weight of about 35,000 was used. The weight ratio of triblock copolymer to diblock copolymer in the blend was 70:30. The first composition tested comprised 87.5 wt % of the block copolymer blend and 12.5 wt % of the same maleated polypropylene as was used in the adhesive compositions of Example 1. The second copolymer tested comprised 75 wt % of the block copolymer blend and 25 wt % of the same maleated polypropylene. The third composition tested contained 62.5 wt % of the block copolymer blend and 37.5 wt % of the same maleated polypropylene. The fourth adhesive composition tested contained 50 wt % of the block copolymer blend and 50 wt % of the same maleated polypropylene. The results obtained in this example are summarized in the following table;

TABLE

| Adhesive Composition | Peel Strength, pli | |
|---|---|---|
|  | polycarbonate | ethylene-vinyl alcohol |
| no maleated PP | ca 0.5 | ca 1.7 |
| 12.5 wt % maleated PP | ca 12.5 | ca 5 |
| 25.0 wt % maleated PP | ca 5 | ca 21 |
| 37.5 wt % maleated PP | ca 0.4 | ca 8 |
| 50.0 wt % maleated PP | ca 10 | ca 3.3 |

As will be apparent from the data summarized in the Table, the adhesive strength of the compositions used in this example with respect to polycarbonate increases with increasing modified polypropylene content until a value of about 12.5 wt % was reached and then decreases to a low for that composition containing 37.5 wt % modified polypropylene but then again increases sharply as the amount of modified polypropylene is increased to 50 wt %. The adhesive strength of the composition with respect to the ethylene-vinyl alcohol copolymer, on the other hand, increases to a maximum value at about 25 wt % modified polypropylene and then decrease rapidly thereafter. The data clearly suggest that an optimum adhesive composition for adhering these two polymeric materials would be a composition containing between 12.5 and 25 wt % modified polypropylene.

While the present invention has been described and illustrated by reference to particular embodiments thereof, it will be appreciated by those of ordinary skill in the art that the same lends itself to variations not necessarily illustrated herein. For this reason, then, reference should be made solely to the appended claims for purposes of determining the true scope of the present invention.

Having thus described and illustrated the present invention, what is claimed is:

1. A laminated structure comprising a plurality of polymeric layers, at least one of said layers being an adhesive composition comprising a modified olefin polymer having incorporated polar groups and at least one selectively hydrogenated block copolymer having at least one block comprised primarily of a monoalkenyl aromatic hydrocarbon monomer and at least one block comprised predominantly of a hydrogenated conjugated diolefin monomer.

2. The laminated structure of claim 1 wherein one of the polymeric layers is an ethylene-vinyl alcohol copolymer.

3. The laminated structure of claim 1 wherein at least one of said polymeric layers is a polycarbonate.

4. The laminated structure of claim 1 wherein said adhesive layer comprises from about 50 to about 95 wt % of said selectively hydrogenated block copolymer and from about 50 to about 5 wt % of said modified olefin polymer.

5. The laminated structure of claim 4 wherein said modified olefin polymer is a maleated polypropylene.

6. The laminated structure of claim 5 wherein said adhesive layer comprises from about 60 to about 90 wt % of said selectively hydrogenated block copolymer and from about 40 to a about 10 wt % of said maleated polypropylene.

7. The laminated structure of claim 1 comprising at least one layer of ethylene-vinyl alcohol copolymer and at least one layer of a polycarbonate, said adhesive composition layer being between said ethylene-vinyl alcohol copolymer layer and said polycarbonate layer.

8. The laminated structure of claim 1 comprising at least one layer of polypropylene, one layer of ethylene-vinyl alcohol copolymer and one layer of polycarbonate, each of said layers having an adhesive composition layer there between.

9. The laminated structure of claim 7 prepared via coextrusion.

10. The laminated structure of claim 1 wherein said at least one selectively hydrogenated block copolymer is a blend containing a selectively hydrogenated triblock copolymer and a selectively hydrogenated diblock copolymer.

11. The laminate structure of claim 1 wherein said monoalkenyl aromatic hydrocarbon monomer is styrene and said hydrogenated conjugated diolefin is butadiene.

12. The laminated structure of claim 4, wherein said selectively hydrogenated block copolymer is a styrene-butadiene-sytrene triblock copolymer.

13. The laminated structure of claim 12, wherein said adhesive layer comprises from about 5 to about 25 weight percent of said modified olefin polymer.

14. The laminated structure of claim 13, wherein said modified olefin polymer is maleated polypropylene.

15. The laminated structure of claim 10, wherein said blend comprises from about 60 to about 97 weight percent of said triblock copolymer and from about 40 to about 3 weight percent of said diblock copolymer.

16. The laminated structure of claim 15, wherein said selectively hydrogenated triblock copolymer is a styrene-butadiene-styrene triblock copolymer and said selectively hydrogenated diblock copolymer is a styrene-butadiene diblock copolymer.

* * * * *